US011388268B1

(12) United States Patent
Siva et al.

(10) Patent No.: US 11,388,268 B1
(45) Date of Patent: Jul. 12, 2022

(54) NETWORK SYSTEMS AND METHODS FOR CXL STANDARD

(71) Applicant: Marvell Asia Pte, Ltd., Singapore (SG)

(72) Inventors: Kumaran David Siva, Santa Clara, CA (US); Arash Farhoodfar, Santa Clara, CA (US); Radhakrishnan L. Nagarajan, Santa Clara, CA (US)

(73) Assignee: Marvell Asia Pte Ltd., Singapore (SG)

( * ) Notice: Subject to any disclaimer, the term of this patent is extended or adjusted under 35 U.S.C. 154(b) by 69 days.

(21) Appl. No.: 16/777,655

(22) Filed: Jan. 30, 2020

(51) Int. Cl.
| | | |
|---|---|---|
| G06F 13/12 | (2006.01) | |
| G06F 13/38 | (2006.01) | |
| H04B 10/278 | (2013.01) | |
| H04B 10/80 | (2013.01) | |
| H04L 1/00 | (2006.01) | |
| H04L 69/10 | (2022.01) | |
| H04L 69/12 | (2022.01) | |
| H04L 69/16 | (2022.01) | |
| H04L 69/18 | (2022.01) | |

(52) U.S. Cl.
CPC ............ *H04L 69/18* (2013.01); *G06F 13/128* (2013.01); *G06F 13/387* (2013.01); *H04B 10/278* (2013.01); *H04B 10/801* (2013.01); *H04L 1/0001* (2013.01); *H04L 1/004* (2013.01); *H04L 69/10* (2013.01); *H04L 69/12* (2013.01); *H04L 69/16* (2013.01); *G06F 2213/0008* (2013.01); *G06F 2213/0026* (2013.01)

(58) Field of Classification Search
CPC .... G06F 13/10–4295; G06F 2213/0002–4004; H04B 10/03–90; H04J 14/002–086; H04J 2203/0001–0098; H04L 1/0001–248; H04L 69/02–40; H04Q 11/0001–08; H04Q 2011/0007–0098
See application file for complete search history.

(56) References Cited

U.S. PATENT DOCUMENTS

2020/0226018 A1\* 7/2020 Das Sharma ....... G06F 13/4027

OTHER PUBLICATIONS

Das Sharma, Introduction to Compute Express Link, Mar. 2019, White Paper (Year: 2019).\*

\* cited by examiner

*Primary Examiner* — Timothy J Weidner

(57) ABSTRACT

A first processing unit for a computer server apparatus includes a first circuit configured to process a first type of data to be transmitted and received over a communication channel in accordance with a peripheral component interconnect express (PCIe) protocol, a second circuit configured to process a second type of data to be transmitted and received over the communication channel in accordance with a compute express link (CXL) protocol, and an optical communication interface configured to modulate the first type of data and the second type of data into a first signal in a PAM format to be transmitted over the communication channel to a second processing unit and receive, from the second processing unit over the communication channel, a second signal including either one of the first type of data and the second type of data modulated in the PAM format.

18 Claims, 9 Drawing Sheets

200

NETWORK SYSTEMS AND METHODS FOR CXL STANDARD

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to network systems and methods.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. Communication networks are also important in computational applications, such as artificial intelligence and deep learning, wherein computational tasks are performed by more than one processing entities. For example, multiple computing entities (e.g., central processing units) and devices (e.g., memory, storage, etc.) can be interconnected to form a computing network cluster, which a large amount of computation and data processing is shared among the these entities and devices.

For a long time, for short range and very short range communication, peripheral component interconnect express (PCIe) standard has been widely used. PCIe offers high bandwidth suitable for CPU-to-device and CPU-memory connections. In 2019, a consortium of technology companies formed compute express link (CXL) standard that builds upon the PCIe physical and electrical interface, with additional protocol in I/O, memory, and cache coherence. While many companies joined the CXL 1.0 specification that was published in March 2019, the standard is still evolving. It is to be appreciated that embodiments of the present invention build provide additional functionalities for the CXL standard, as described below.

BRIEF SUMMARY OF THE INVENTION

The present invention is directed to network systems and methods. More specifically, embodiments of the present invention provide a network apparatus that includes a central processing unit that is includes both PCIe and CXL blocks for data transfer. The network apparatus includes a communication link that is configured to transfer data in PAM format at high speed and low latency. The apparatus additional includes a retimer or a gearbox for adjusting data transfer rate. Various components, such as memory and processing devices, can be connected to the central processing unit via the communication link. There are other embodiments as well.

According to an embodiment, the present invention provides a computer server apparatus, which includes a central processing unit that has a PCIe block and a CXL block. The apparatus also includes a high-speed communication link, which is configured in a PAM4 modulation format and a high gain of greater than a 3 dB coding gain and less than 20 dB and a low latency FEC of about 20 to 300 nanoseconds. The high-speed communication link is coupled to the central processor unit. The apparatus further includes a retimer device coupled to the high-speed communication link. The apparatus also includes a plurality of processing devices coupled to the high-speed communication link to communicate to the central processing unit. The apparatus further includes a plurality of memory devices coupled to the high-speed communication link. The apparatus additionally includes a network interface device coupled to the high-speed communication link.

According to another embodiment, the present invention provides a semiconductor integrated circuit device, which includes a semiconductor substrate. The device also includes a plurality of transmit devices. The device further includes a plurality of receive devices. The device also includes a bus device that includes a transmit device and a receive device. The bus device is coupled to a management device and an FEC device. The device also includes a switch device configured between each of the plurality of transmit devices and each of the receive devices.

According to yet another embodiment, the present invention provides a server apparatus, which includes an optical ring device. The apparatus also includes a plurality of processing devices coupled to the optical ring device. Each of the processing devices is coupled to a silicon photonics device. The silicon photonics device is coupled to the optical ring device. The apparatus also includes a plurality of memory devices coupled to the optical ring device. Each of the memory devices is coupled to the silicon photonics device. The plurality of memory devices is coupled to the optical ring device.

According to yet another embodiment, the present invention provides a computer server apparatus, which includes a central processing unit device comprising a PCIe block and a CXL block. The apparatus further includes an optical communication link, which is configured in a PAM4 modulation format. The apparatus also includes a plurality of processing devices coupled to the optical communication link to communicate to the central processing unit device. Each of the processing devices is coupled to a silicon photonics device coupled to the optical communication link. The apparatus further includes a plurality of memory devices coupled to the optical communication link. Each of the memory devices is coupled to a silicon photonics device coupled to the optical communication link.

It is to be appreciated that embodiments of the present invention provide many advantages over conventional techniques. Among other things, by providing high-speed optical communication with low latency, embodiments of the present invention allow two or more computing clusters to be interconnected to share computational resources and work together. For example, embodiments of the present invention are implemented in compliance with CXL and PCIe standards, where both NRZ and PAM4 encoding schemes are used. Depending on the bandwidth and latency requirements, network devices and systems can switch between different communication modes, providing flexibility and modularity.

Embodiments of the present invention can be implemented in conjunction with existing systems and processes. For example, network devices and components according to the present invention can be manufactured using existing manufacturing equipment and techniques. In various implementations, systems and devices according to the present invention are compatible with existing protocols and standards (e.g., PAM4, NRZ, PCIe, CXL, etc.). There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
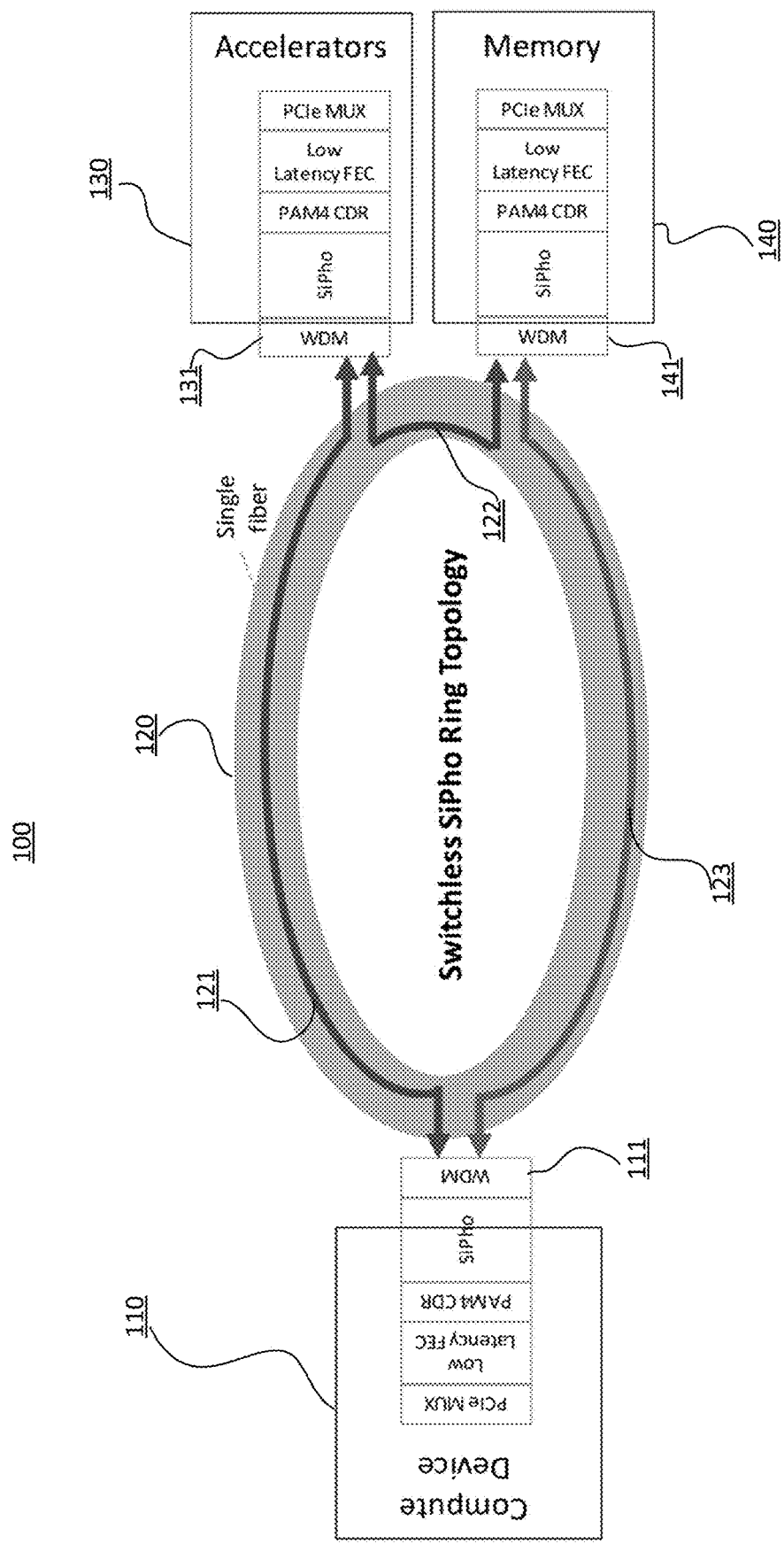
FIG. 1 is a simplified diagram illustrating a system with a switchless topology according to embodiments of the present invention.

The present invention is directed to network systems and methods. More specifically, embodiments of the present invention provide a network apparatus that includes a central processing unit that is includes both PCIe and CXL blocks for data transfer. The network apparatus includes a communication link that is configured to transfer data in PAM format at high speed and low latency. The apparatus additional includes a retimer or a gearbox for adjusting data transfer rate. Various components, such as memory and processing devices, can be connected to the central processing unit via the communication link. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a system with a switchless topology according to embodiments of the present invention. This diagram is merely an example, which should not unduly limit the scope of the claims. One of ordinary skill in the art would recognize many variations, alternatives, and modifications. The compute express link (CXL) standard is suitable for very high speed and high bandwidth communication, which is important in applications such as distributed computing. As an example, FIG. 1 illustrates a ring topology 100. For the purpose of illustration, the ring topology 100 includes three entities, which are compute device 110, accelerators 130, and memory 140 as shown. The communication channel 120 includes optical links 121, 122, and 123. For example, each of these optical links includes a single optical fiber, and they directly connect the three entities with one another. As shown, optical link 121 directly connects entities 100 and 130; optical link 122 directly connects entities 130 and 140; and optical link 123 directly connects entities 110 and 130.

Each of the three entities in FIG. 1 includes an optical communication interface for transmitting and receiving data over communication channel 120. For example, compute device 100 includes, as shown, a PCIe multiplexer (MUX), a low-latency forward error correction (FEC) module, a PAM4 clock data recovery (CDR) module, a silicon photonic (SiPho) module, and a wavelength division multiplexing (WDM) interface 111. It is to be appreciated that while PAM4 format is described here as an example, other PAM formats (e.g., PAM8, PAM16, etc.) may be used as well. The accelerator 130 and memory 140 similarly include these communication components for transmitting data over these the communication channel 120. It is to be appreciated that the SiPho module and WDM interface allow for switchless communication, where data can transmit over communication channel 120 without using switches on communication channel 120. By performing wavelength multiplexing, communication channel 120 can efficiently provide point-to-point connections without relying on conventional cable connections. For example CXL/PCIe data from each of three entities originate directly from the entities themselves, and the respective SiPho modules modulate these data into optical signal. In various embodiments, power management of SiPho modules is dynamically provided to ensure a high level of efficiency.

Figure 2:
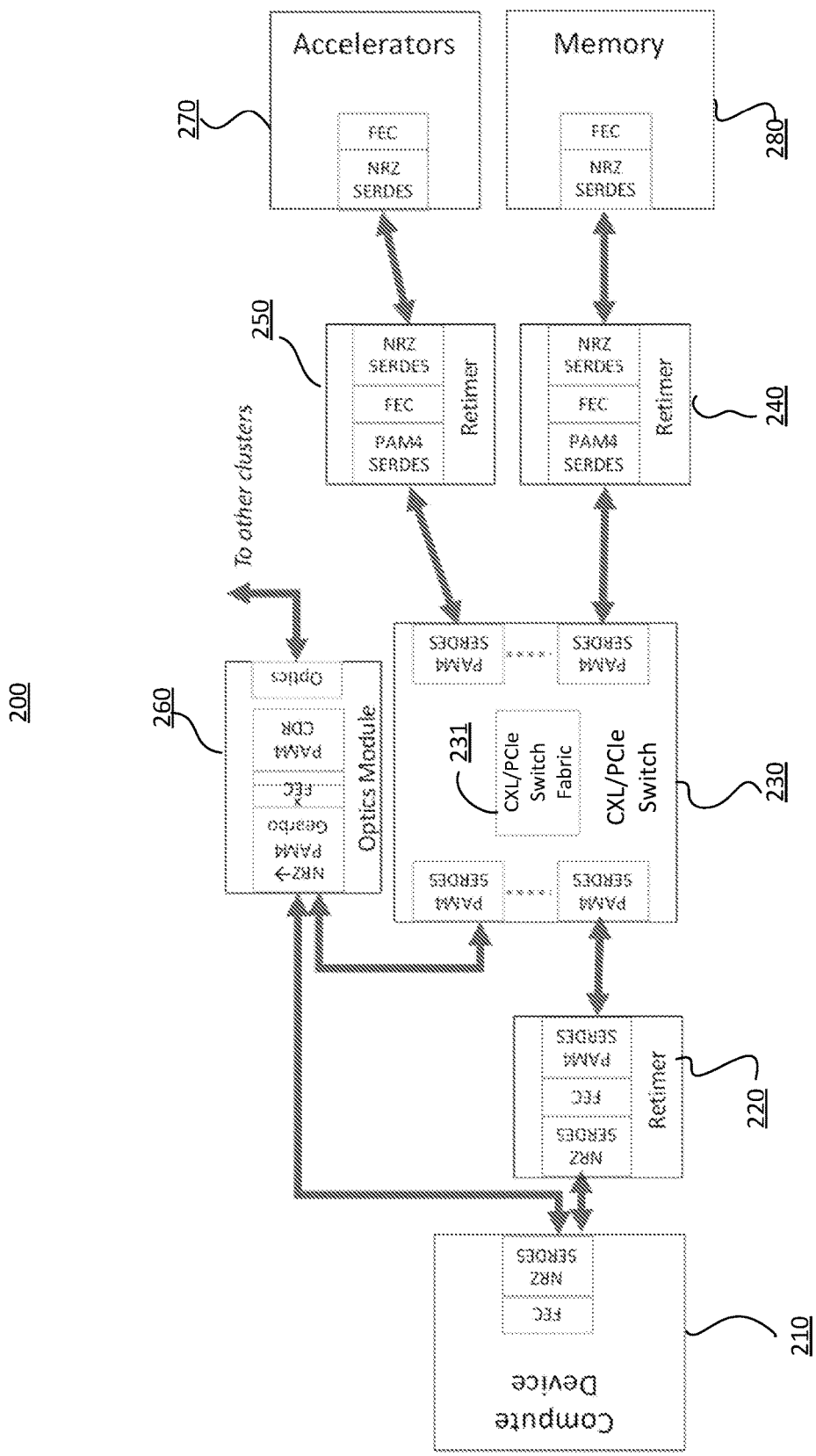
FIG. 2 is a simplified diagram illustrating a switching topology with optical connectivity according to embodiments of the present invention.

FIG. 2 is a simplified diagram illustrating a switching topology with optical connectivity according to embodiments of the present invention. This diagram is merely an example, which should not unduly limit the scope of the claims. One of ordinary skill in the art would recognize many variations, alternatives, and modifications. In an illustrative topology 200 as shown, the entities within the topology are optically and/or electrically connected to each other for data transmission. For example, non-return to zero (NRZ) based communication links are multiplexed under PCIe multiplexing regime, and optical communication is multiplexed under PAM4 regime. In various embodiments, switching topology 200 in FIG. 2 is implemented as a cluster of entities configured to perform artificial intelligence (AI) computations, which generally requires high data throughput. For example, compute device 210 communicates with accelerators 270 (which speeds up the AI computation process) and memory 280 within switching topology 200, and together these three entities perform as a functional cluster. They are interconnected to one another via retimers (blocks 220, 240, and 250) and switch 230. For example, retimers (i.e., blocks 220, 240, and 250) are mixed signal (analog and digital) devices that are protocol-aware and have the ability to fully recover the data, to extract the embedded clock, and to retransmit fresh copies of the data using a clean clock. The fresh copies of the data are generated by the retimers are suitable for the intended applications that require low latency and high transmission speed.

For the purpose of illustration, only the communication portion of the entities 210, 270, and 280 are shown. Compute device 210 includes an FEC module for encoding and an NRZ SerDes for generating NRZ data, and it communicates with retimer 220 using NRZ protocol. For example, the communication link between compute device 210 and retimer 220 comprises an electrical connection. Retimer 220 includes an NRZ SerDes for processing NRZ signals, and FEC module for FEC encoding, and a PAM4 SerDes for generating PAM4 data that are to be transmitted to switch 230. In various embodiments, the FEC module performs at low latency to enable low-latency (e.g., 20 to 300 nanoseconds in a specific implementation, and less than 40 nanoseconds in certain implementations) connectivity. Retimers 240 and 250 respectively perform similar functions for memory 280 and accelerators 270. Retimers 230, 240, and 250 are all connected to switch 230. For example, retimers generate fresh copies of data at higher rate (than the data rates at which they were received) and transmit the higher rate data to switch 230. Switch 230 performs CXL/PCIe multiplexing and transmits multiplexed data to optical module 260. For example, the CXL/PCIe multiplexing process takes data received from retimer and transmits them at a high data rate (e.g., the higher data rates provided by the retimer). Switch 230 includes a CXL/PCIe switch fabric through which various network nodes are interconnected. The higher rate data are processed by optics module 260, which is connected to other computational (e.g., AI) clusters. Optics module 260 is implemented at a high data rate (e.g., 16 Gbs or higher) and low latency. Optics module 260 includes a gearbox that converts NRZ data (low data rate) to PAM4 data (high data rate). Optics module 260 additionally includes FEC module for FEC encoding. In an implementation, the FEC module includes a soft FEC encoding scheme that makes use of parity bits to provide a coding gain of about 1.3 dB, and this soft FEC technique is described in U.S. patent application Ser. No. 15/691,023, entitled "SOFT FEC WITH PARITY CHECK", filed Aug. 30, 2017, which is incorporated by reference herein. Optic module 260 additionally includes PAM4 CDR for clock recovery. Optic module 260 includes optics for transmitting and receiving optical signals.

Figure 3:
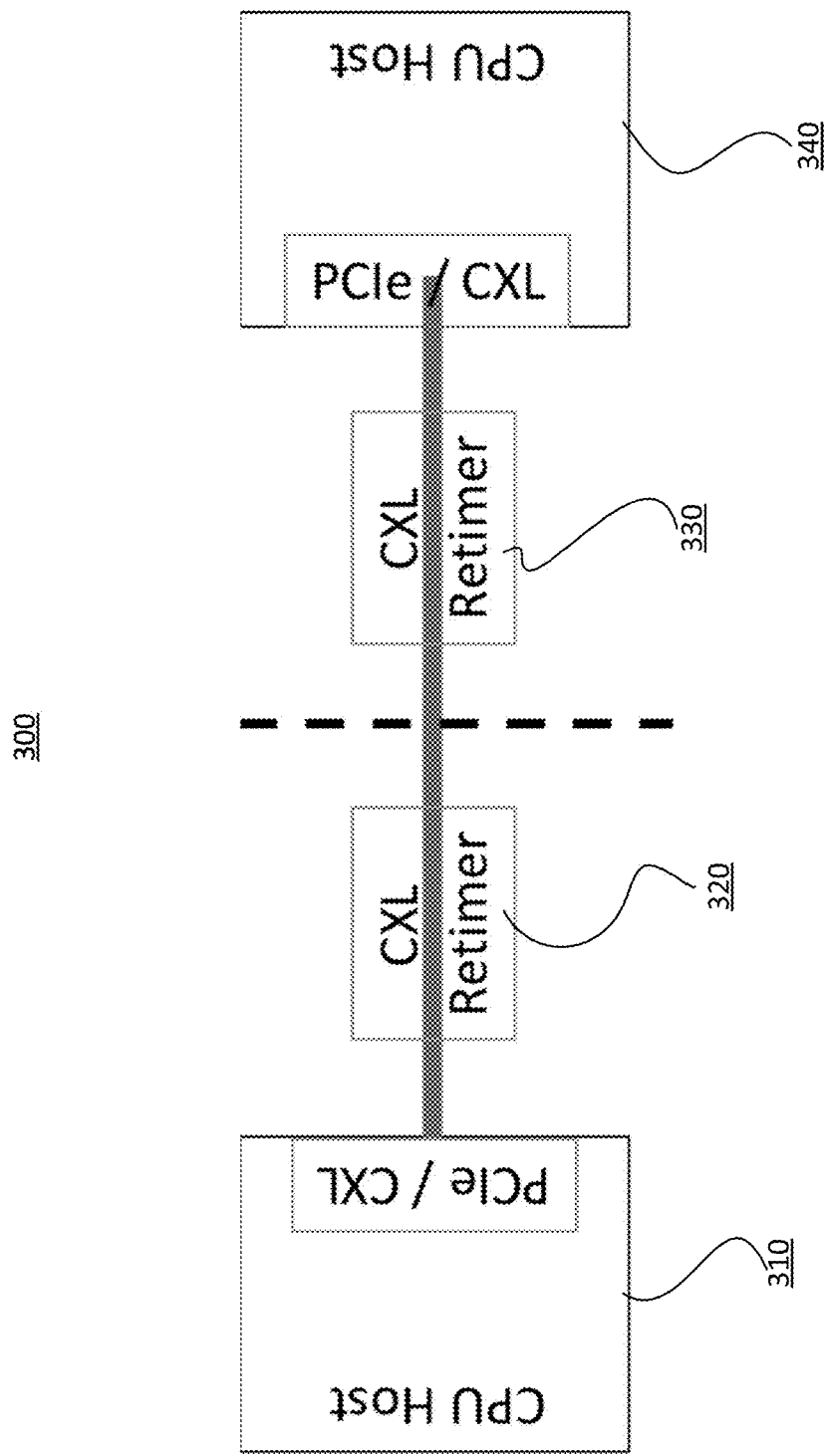
FIG. 3 is a simplified diagram illustrating communication configuration with direct connection between retimers according to embodiments of the present invention.

FIG. 3 is a simplified diagram illustrating communication configuration with direct connection between retimers according to embodiments of the present invention. This diagram is merely an example, which should not unduly limit the scope of the claims. One of ordinary skill in the art would recognize many variations, alternatives, and modifications. CPU host 310 is connected to CXL retimer 320, which adjusts transmission data rate. Similarly, CPU host 340 is connected to CXL retimer 330. CPU host 310 and CPU host 340 communicate with each other via their respective CXL retimers 320 and 330. It is to be appreciated that CXL retimer 320 and CXL retimer 330 are both compliant with the CXL standard, which allows for high data rates.

Figure 4:
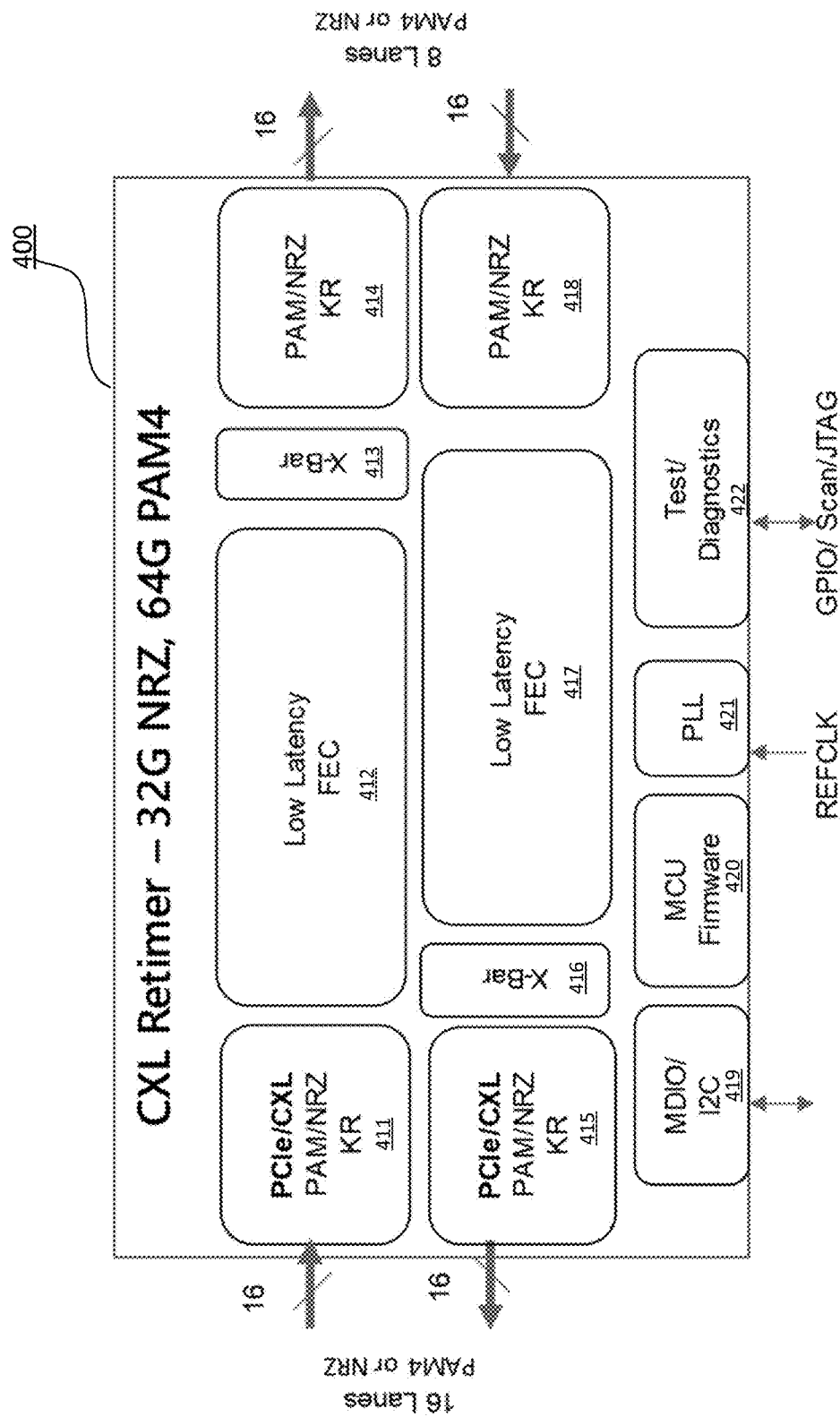
FIG. 4 is a simplified diagram illustrating a CXL retimer according embodiments of the present invention.

FIG. 4 is a simplified diagram illustrating a CXL retimer according embodiments of the present invention. This diagram is merely an example, which should not unduly limit the scope of the claims. One of ordinary skill in the art would recognize many variations, alternatives, and modifications. As an example, retimer 400 is configured to work with NRZ protocol and PAM4 protocol, which provide different data rates for different applications. For example, PCIe/CXL receiving interface 411 and transmitting interface 415 each provides 16 lanes communication lanes that can operate in PAM4 and NRZ formats. As an example, interfaces 411 and 415 are capable of low-latency and high-speed communication as demanded for retimer 400. The FEC modules 412 and 417 are specifically configured to performing decoding and encoding process at low-frequency (e.g., less than 50 nanoseconds). In various embodiments, in addition to low-latency operations, FEC modules 412 and 417 are configured to perform soft FEC (e.g., taking advantage of interleaved parity bits as described above) operations for additional coding gain.

Retimer 400 additionally includes PAM/NRZ interfaces 414 and 418 for, respectively, for transmitting and receiving data in PAM4 and NRZ formats. Retimer 400 additionally includes components such as management data I/O (MDIO) module 419, microcontroller unit (MCU) firmware module 420, phase-lock loop (PLL) 421, and test/diagnostics module 422. For example, PLL 421 is associated with processing clock signals. In various embodiment, module 420 may update the firmware stored therein to improve performance.

It is to be understood that while FIG. 4 shows retimer 400 operating with 16 or 8 communications, retimer 400 may be adapted to support multiple communication modes, such as 4 lane mode, 8 lane mode, and 16 mode, operating in bi-directional modes.

Figure 5:
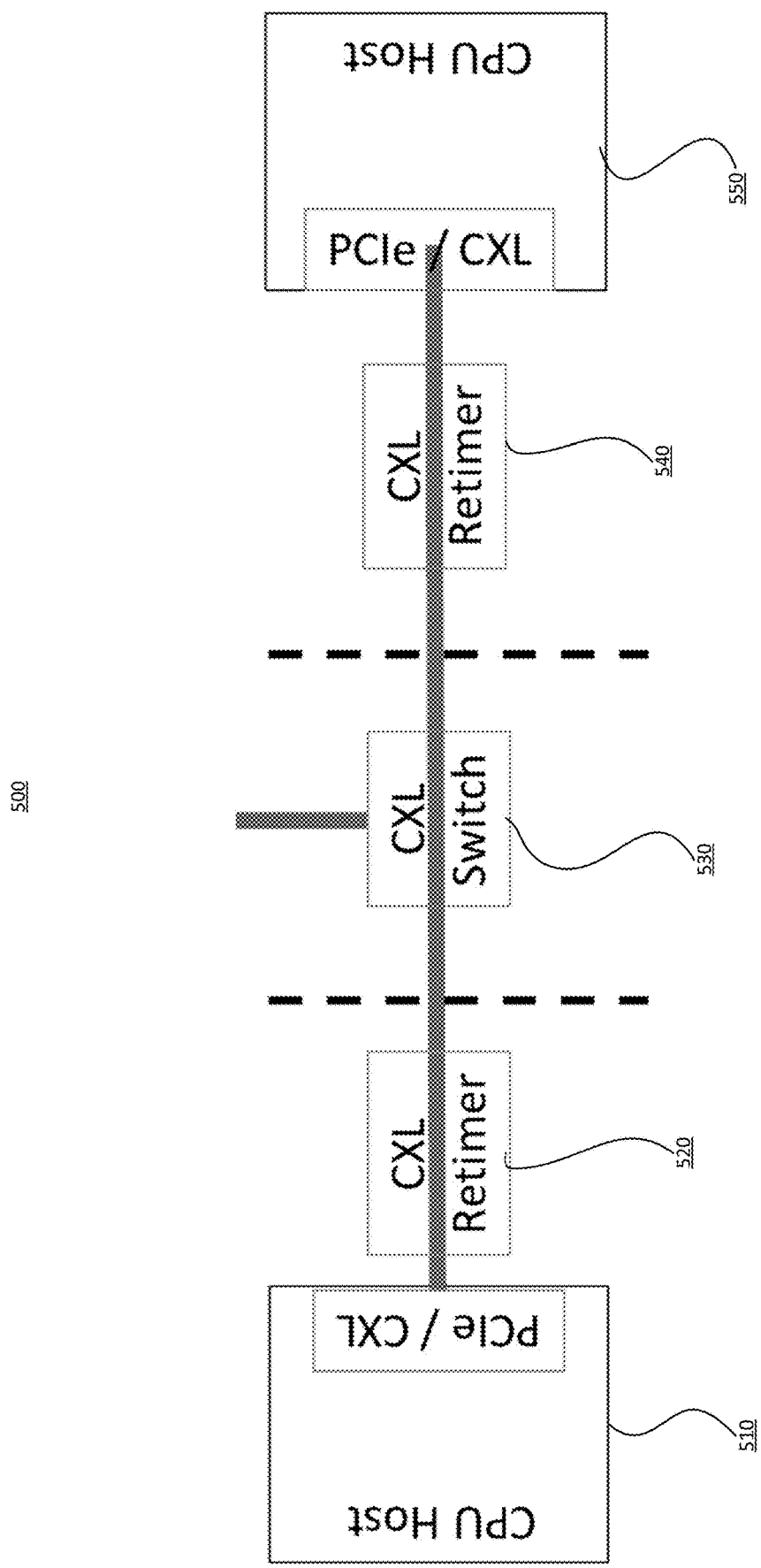
FIG. 5 is a simplified diagram illustrating communication configuration where retimers are connected via a CXL switch according to embodiments of the present invention.

FIG. 5 is a simplified diagram illustrating communication configuration where retimers are connected via a CXL switch according to embodiments of the present invention. This diagram is merely an example, which should not unduly limit the scope of the claims. One of ordinary skill in the art would recognize many variations, alternatives, and modifications. CPU host 510 is connected to CXL retimer 520, which adjusts transmission data rate. Similarly, CPU host 550 is connected to CXL retimer 540 that adjusts data rate. CPU host 510 and CPU host 550 communicate with each other via their respective CXL retimers 520 and 540. It is to be appreciated that CXL retimer 520 and CXL retimer 540 are both compliant with the CXL standard, which allows for high data rate. In contrast to FIG. 5, retimers 520 and 540 do not communicate directly with each other, but through CXL switch 530. For example, CXL switch 530 comprises, among other components, communication interfaces and switch fabric for managing data links. Additionally, CXL switch 530 is configured to operate with CXL protocols.

Figure 6:
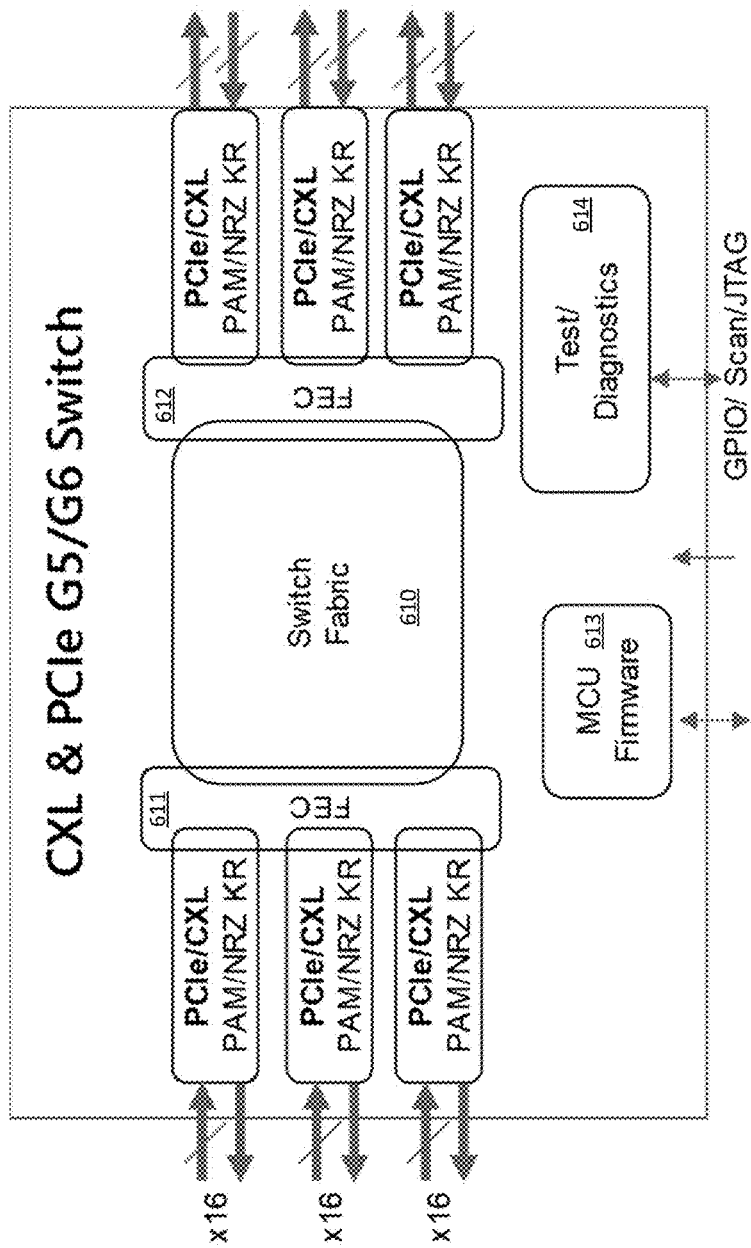
FIG. 6 is a simplified diagram illustrating CXL with according to embodiments of the present invention.

FIG. 6 is a simplified diagram illustrating CXL with according to embodiments of the present invention. This diagram is merely an example, which should not unduly limit the scope of the claims. One of ordinary skill in the art would recognize many variations, alternatives, and modifications. Switch 600 as shown is a CXL switch (e.g., CXL switch 530 in FIG. 5), which includes high-speed communication interfaces for connecting to retimers and/or other entities. Switch 600 includes FEC modules 611 and 612, which are configured to perform low-latency (e.g., lower than 50 nanoseconds) FEC encoding. In various embodiments, switch 600 is implemented with a high level of power efficiency (e.g., power consumption of less than 15 W). Switch 600 can be configured to provide a cut-through mode, which allows for ultra-low latency. For example, the FEC encoding performed by FEC modules 611 and 612 may include soft FEC encoding, as explained above). Switch 600 additionally includes MCU module 613 for managing communication and miscellaneous functionalities. The functionalities of MCU module 613, which affects the behavior of switch 600, can be modified by firmware update. For example, MCU module 613 includes nonvolatile memory for storing firmware. Switch 600 additionally includes test/diagnostic module 614. For example, module 614 tests and calibrates various operating parameters of switch 600.

Figure 7:
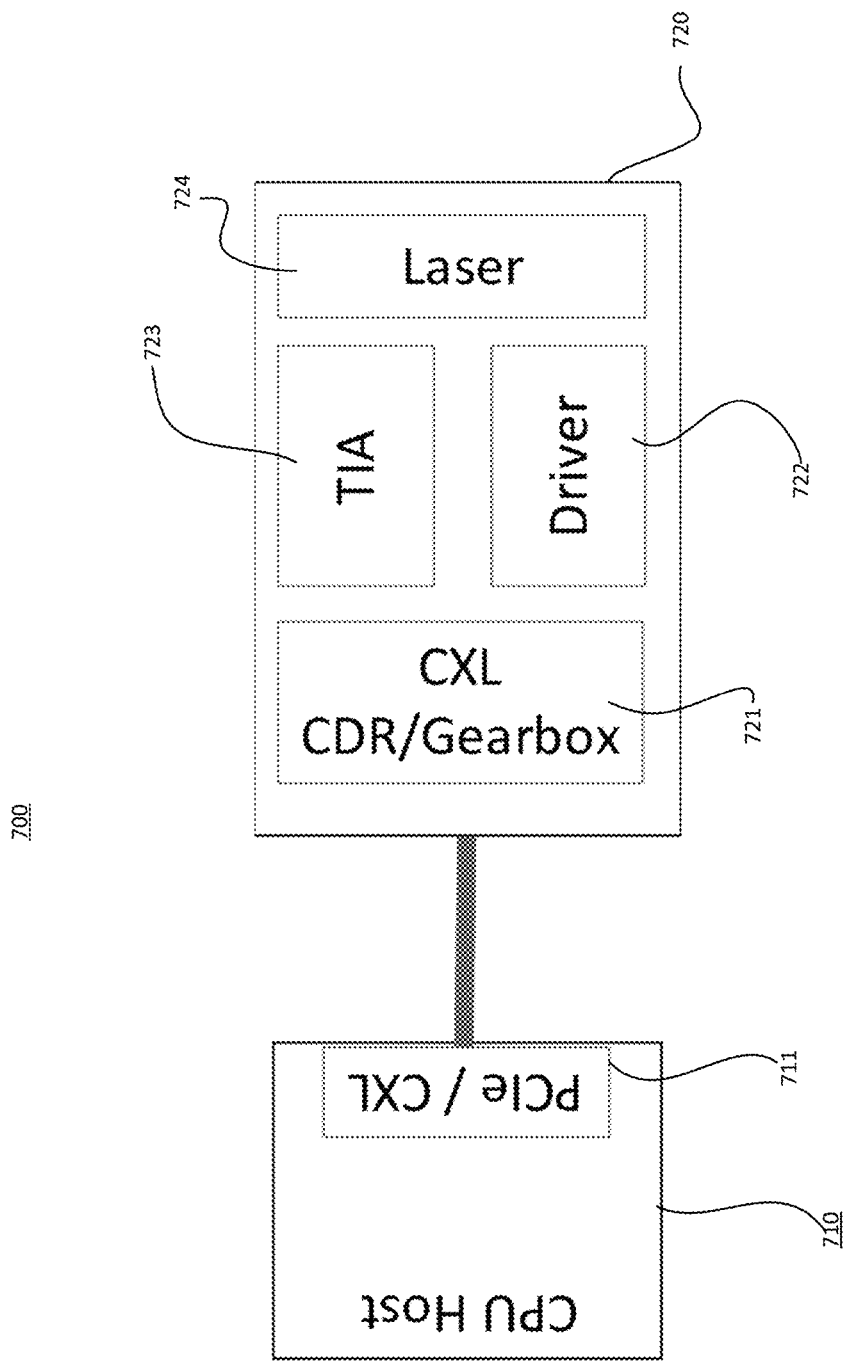
FIG. 7 is a simplified diagram illustrating an optical communication module according to embodiments of the present invention.

FIG. 7 is a simplified diagram illustrating an optical communication module according to embodiments of the present invention. This diagram is merely an example, which should not unduly limit the scope of the claims. One of ordinary skill in the art would recognize many variations, alternatives, and modifications. For example, optical module 720 in FIG. 7 can be used to implemented the optics module 260 in FIG. 2. CPU host 710 includes a PCIe/CXL interface 711 for sending data to optical module 720. For example, CPU host 710 transmits data at a very high speed, which is suitable for applications and tasks that require low latency and high bandwidth. For example, the communication link between CPU host 710 and module 720 is an electrical communication link at a high speed, and the module 720 is capable of optical transmitting data at an even higher speed.

Optical module 720 includes CXL gearbox 721 that changes data rate for transmission. For example, gearbox 721 is also coupled to other entities (e.g., accelerator 270 and memory 280 in FIG. 2), and it is configured to perform multiplexing to transmit data from different devices. Driver 727 uses multiplexed data from gearbox 721 to generate driver signal. For example, driver 727 includes MZM modulator to generate driving signal for optical modulation. Optical module 720 includes a transimpedance (TIA) module 723 for converting received optical signal (e.g., via an optical receiver not shown in FIG. 7) to electrical signal for processing. Additionally, optical module 720 includes laser 724 as the light source, using which optical signal is generated and transmitted.

Figure 8:
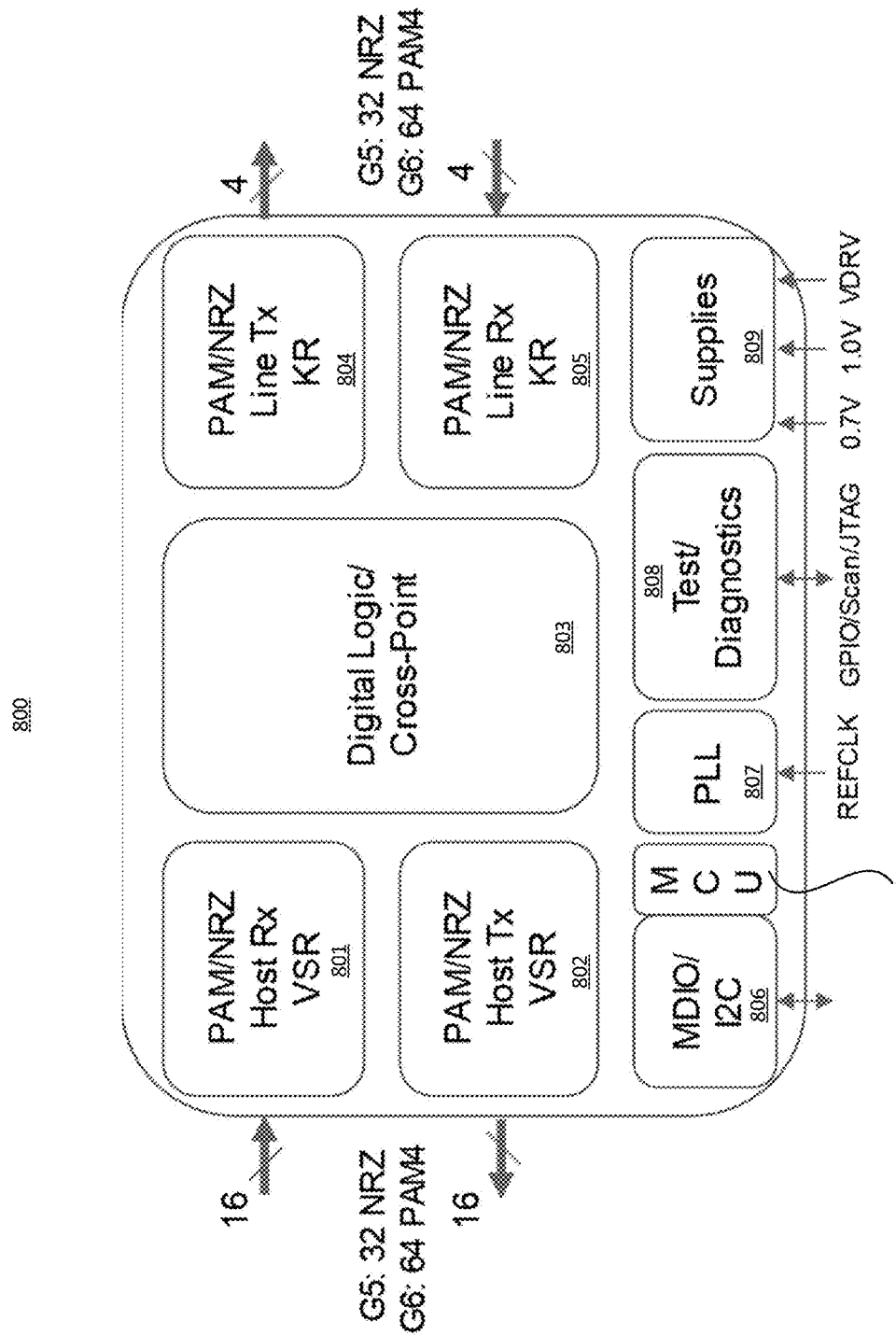
FIG. 8 is a simplified diagram illustrating a PAM4 module device according to embodiments of the present invention.

FIG. 8 is a simplified diagram illustrating a PAM4 module device according to embodiments of the present invention. This diagram is merely an example, which should not unduly limit the scope of the claims. One of ordinary skill in the art would recognize many variations, alternatives, and modifications. As an example, PAM4 module 800 performs various functionalities of gearbox 721 in FIG. 7. It is to be appreciated that PAM4 module 800 is optimized for high speed and low latency, and its application is suitable for interconnecting entities within a computational cluster, which communicates with one another within a very short reach (VSR). In various embodiments, the PAM4 module is configured to perform at a very low latency (e.g., less than 50 nanoseconds). For example, PAM4 module 800 is configured to be power efficient, operating at lower than 2 W. In various embodiments, PAM4 module 800 operates at different levels of power consumption (e.g., via multiple power mode schemes) depending on the amount of data it processes.

PAM4 module 800 includes host interfaces 801 and 802, which are respectively configured for receiving and transmitting data. For example, host interfaces 801 and 802 are each configured to operate up to 16 communication lanes, and they are able operate in other modes as well (e.g., 8 lanes, 4 lanes, 2 lanes and a single lane). Host interfaces 801 and 802 are configured to up convert NRZ data transmission (e.g., at 32G rate) to PAM4 data transmission (e.g., at 64G), and to down convert from PAM4 data to NRZ data. Similarly, line interfaces 804 and 805, respectively configured for transmitting and receiving data, are also configured to up convert NRZ data transmission (e.g., at 32G rate) to PAM4 data transmission (e.g., at 64G), and to down convert from PAM4 data to NRZ data. For example, PAM4 module 800 functioning as the gearbox, two lanes for NRZ data at 32G (e.g., PCIe G5) is converted to 64G PAM4 (e.g., PCIe G6) data that transmitted over a single PAM4 lane. In a way, module 800 also functions as a retimer. For example, two lanes of PCIe G5 (e.g., 32G NRZ) data are converted to PCIe C5 (e.g., 32G NRZ) data. As another example, PCIe G6 (e.g., 64 NRZ) data is converted to PCIe C5 (e.g., 32G NRZ) data.

Module 800 additionally includes a digital logic module 803 for multiplexing and data switching to allow data from different communication lanes to correctly routed. MDIO module 806 provides various input and output functionality. It is to be appreciated that MCU 810 may be programmed to perform various system and control functions. In an embodiment, MCU 810 comprises non-volatile storage that stores firmware that can be updated and reconfigured. Module 800 includes PLL 807 for clock signals. For example, PLL 807 generates reference clock signal based on the received data. Module 800 additionally includes a test/diagnostic module 808. For example, module 808 is determined to perform various diagnostics routines to ensure the proper functionalities of module 800. In various embodiments, module 808 runs calibrations to determine the optimal operating parameters for module 800. For example, module 808 determines the optimal data rate based on the quality of communication lanes. Module 800 receives supply voltage via module 809. For example, module 800 may operate at different voltage levels depending on the operation mode and the system implementation (e.g., difference systems may have different voltage supplies). In certain embodiments, supplies module 809 provides power regulation functions.

Figure 9:
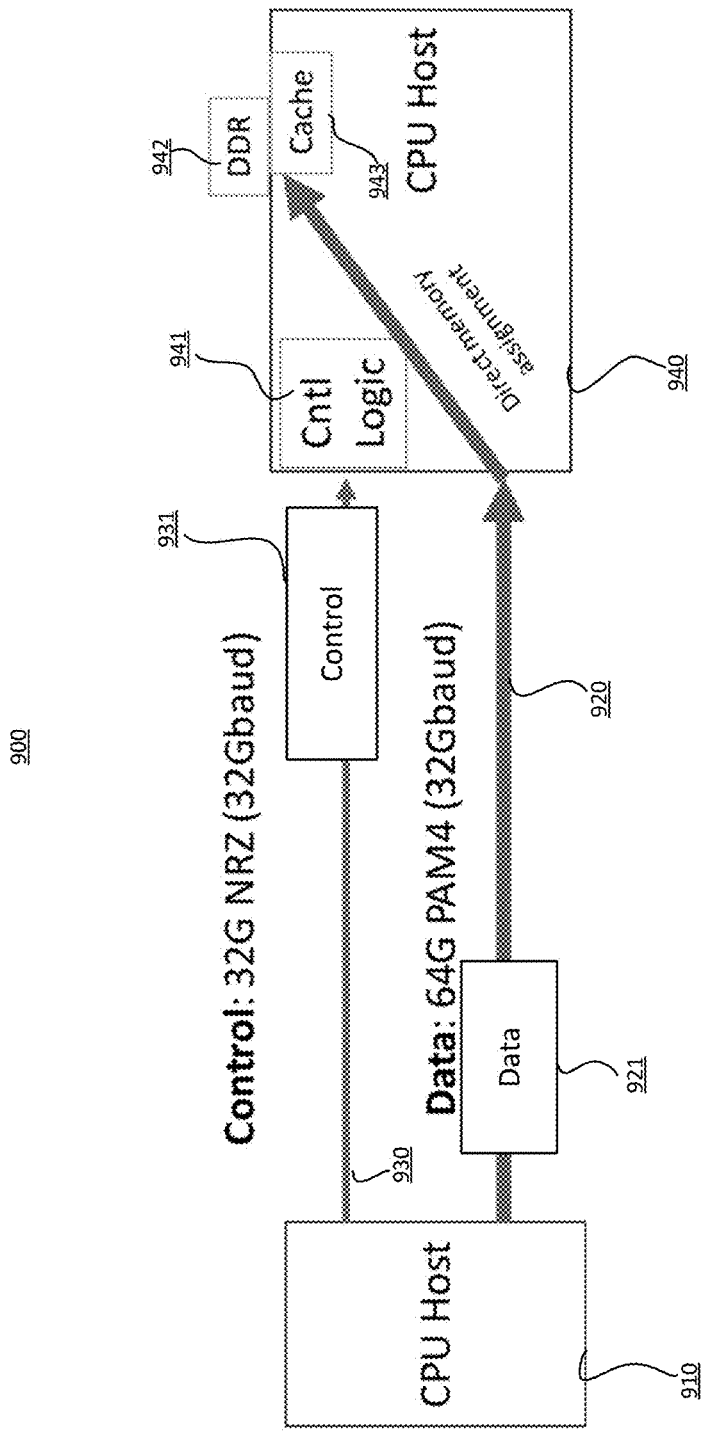
FIG. 9 is simplified diagram illustrating a switch utilizing both NRZ and PAM protocols according to embodiments of the present invention.

FIG. 9 is simplified diagram illustrating a switch utilizing both NRZ and PAM protocols according to embodiments of the present invention. This diagram is merely an example, which should not unduly limit the scope of the claims. One of ordinary skill in the art would recognize many variations, alternatives, and modifications. There are two communication lanes between CPU host 910 and CPU host 940. Communication lane 930 is configured for NRZ (e.g., 32G) transmission. Communication lane 920 is configured for PAM4 (e.g., 64G) communication. It is to be appreciated that PAM4 protocol offers higher data rate than NRZ protocol, PAM4 protocol involves a higher latency (e.g., due to transmission delay at higher data rate) than that of NRZ protocol. For example, control data packet 831 is generally smaller than data packet 921. Control data packet 831 is transmitted over communication lane 930, and it arrives earlier than data packet 921. CPU host 940 uses the information provided by control data packet 831 to set various parameters of control logic 941. For example, control data packet 831 may include information associated with communication protocol, data transmission mode, etc. In a specific embodiment, control data packet 831 includes power control information associated with PAM4 data communication. Control data packet 831 may additionally include out of band error correction code. Data packet 921 is transmitted over communication lane 920 at a high data rate. In various embodiments, CPU host 940 is configured with direct memory assignment (e.g., pursuant to CXL protocol) and writes data directly to cache 943 and/or memory 942.

It is to be appreciated that there various implementations of communication and computational systems according to embodiments of the present invention. In an embodiment, the present invention provides a computer server apparatus that includes a central processing unit device comprising a PCIe block and a CXL block. For example, the computer server apparatus is illustrated in FIG. 2. As an example, the CXL block is configured for a dynamic multi-protocol process, which is selected from a look-up table including a cache process, a memory process, or an I/O process. The apparatus includes a high speed communication link, which is configured in a PAM4 modulation format. The communication link is characterized by a high gain of greater than a 3 dB coding gain and less than 20 dB and a low latency FEC of about 20 to 300 nanoseconds. The communication link connects the central processing unit to other entities of the apparatus. In a specific embodiment, the high speed communication is at a rate of 16 Gigabit per second to 256 Gigabit per second.

The apparatus also includes a retimer device coupled to the high speed communication link. The apparatus also includes a plurality of processing devices coupled to the high speed communication link to communicate to the central processing unit device. For example, the plurality of processing devices include accelerators 270 as shown in FIG. 2. As an example, wherein the plurality of processing devices is one of a processing device, a digital signal processing device, and an artificial intelligence processing device.

The apparatus also includes a plurality of memory devices coupled to the high speed communication link. For example, memory devices include memory 280 shown in FIG. 2. For example, the plurality of memory devices is one of a dynamic random access memory device, a static random access memory device, a Flash memory device, a fixed memory device, or other non-volatile memory device.

The apparatus also includes a network interface device coupled to the high speed communication link. For high speed data transmission, PAM4 protocol may be employed. In various embodiments, the apparatus includes a PAM4 module, which includes a transmit device, a receiver device, a management device, and a FEC device. For example, the PAM4 module is configured to receive an incoming PAM4 signal using the receiver device, and to transmit an outgoing PAM4 signal using the transmit device.

In various embodiments, clusters of devices as provided as a semiconductor integrated circuit device, which includes a semiconductor substrate. The device also includes a plurality of transmit devices and a plurality of receive devices. The device includes a bus device that includes a transmit device and a receive device. For example, the bus device is coupled to a management device and an FEC device. The device further includes a switch device between configured between each of the plurality of transmit devices and each of the receive devices.

Various communication and computation needs can be performed by a server apparatus according to embodiments of the present invention. For example, a server apparatus includes an optical ring device and a plurality of processing devices coupled to the optical ring device. Each of the processing devices is coupled to a silicon photonics device. The silicon photonics device is coupled to the optical ring device. For example, the optical ring device is illustrated in FIG. 1. The server apparatus also includes a plurality of memory devices coupled to the optical ring device. Each of the memory devices is coupled to a silicon photonics device. For example, the memory devices are coupled to the optical ring device via the silicon photonic device.

Various computer server apparatus may be implemented according to the present invention. In an embodiment, the present invention provides a computer server apparatus that includes a central processing unit device comprising a PCIe block and a CXL block. In a specific embodiment, the CXL block is configured for a dynamic multi-protocol process, which is selected from a look-up table including a cache process, a memory process, or an I/O process. The device also includes an optical communication link that is configured in a PAM4 modulation format. For example, the optical communication link is at a rate of 16 Gigabit per second to 256 Gigabit per second and is configured in a wave division multiplexing format.

The device additionally includes a plurality of processing devices coupled to the optical communication link to communicate to the central processing unit device. In various embodiments, the plurality of processing devices is one of a processing device, a digital signal processing device, and an artificial intelligence processing device. Each of the processing devices is coupled to a silicon photonics device coupled to the optical communication link. The device further includes a plurality of memory devices coupled to the optical communication link. For example, the plurality of memory devices is one of a dynamic random access memory device, a static random access memory device, a Flash memory device, a fixed memory device, or other non-volatile memory device. Each of the memory devices is coupled to a silicon photonics device coupled to the optical communication link.

The computer server apparatus may additionally include a PAM4 module, which includes a transmit device, a receiver device, a management device, and a FEC device. The PAM4 module is configured to receive an incoming PAM4 signal using the receiver device, and to transmit an outgoing PAM4 signal using the transmit device.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A first processing unit for a computer server apparatus, the first processing unit comprising:
    a first circuit configured to process a first type of data to be transmitted and received over a communication channel in accordance with a peripheral component interconnect express (PCIe) protocol;
    a second circuit configured to process a second type of data to be transmitted and received over the communication channel in accordance with a compute express link (CXL) protocol; and
    an optical communication interface configured to (i) modulate the first type of data and the second type of data into a first signal in a PAM format to be transmitted over the communication channel to a second processing unit and (ii) receive, from the second processing unit over the communication channel, a second signal including either one of the first type of data and the second type of data modulated in the PAM format.

2. The first processing unit of claim 1, further comprising a forward error correction module configured to perform forward error correction on at least one of the first type of data and the second type of data.

3. The first processing unit of claim 1, further comprising a clock data recovery module configured to recover a clock signal from the second signal received over the communication channel.

4. The first processing unit of claim 1, further comprising a silicon photonic module configured to modulate each of the first type of data and the second type of data into the first signal to be transmitted over the communication channel.

5. The first processing unit of claim 1, further comprising a wavelength division multiplexing module configured to perform wavelength multiplexing on the first type of data and the second type of data to be transmitted over the communication channel in the first signal.

6. The first processing unit of claim 1, the optical communication interface being configured to transmit and receive signals in the PAM format (i) at a coding gain between 3 dB and 20 dB and (ii) at a forward error correction latency between 20 and 300 nanoseconds.

7. The first processing unit of claim 2, the optical communication interface being configured to transmit the first signal and receive the second signal over the communication channel at between 16 Gigabits and 256 Gigabits per second.

8. The first processing unit of claim 1, the second circuit being configured to (i) select a process from among a cache process, a memory process, and an I/O process and (ii) process and the second type of data in accordance with the selected process.

9. The first processing unit of claim 1, further comprising a non-return to zero (NRZ) circuit configured to generate configuration data to be transmitted over an NRZ link of the communication channel.

10. A system comprising the first processing unit of claim 1 and further comprising:
    the communication channel; and
    the second processing unit,
    the second processing unit corresponding to at least one of (i) a memory device, (ii) a processing device, and (iii) a network interface coupled to the communication channel.

11. The system of claim 10, the processing device being one of a digital signal processing device and an artificial intelligence processing device.

12. The system of claim 10, the memory device being a non-volatile memory device.

13. The system of claim 12, the non-volatile memory device being one of a dynamic random access memory device, a static random access memory device, a Flash memory device, and a fixed memory device.

14. A system comprising the first processing unit of claim 1 and further comprising:
    the communication channel; and
    a retimer device coupled to the first processing unit and the communication channel.

15. The system of claim 14, wherein the retimer device is configured to receive data at a first rate and transmit data at a second rate greater than the first rate.

16. The system of claim 14, the retimer device comprising (i) a first interface configured to receive the first type data and the second type of data from the first processing unit in the PAM format and (ii) a second interface configured to transmit the first type of data and the second type of data to the first processing unit in the PAM format.

17. The system of claim 16, each of the first interface and the second interface comprising a plurality of communication lanes configured to transmit data in both the PAM format and a non-return to zero (NRZ) format.

18. The system of claim 17, the retimer device further comprising a (i) a third interface configured to receive the first type of data and the second type of data from the communication channel in either of the PAM format and the NRZ format and (ii) a fourth interface configured to transmit the first type of data and the second type of data to the communication channel in either of the PAM format and the NRZ format.

\* \* \* \* \*